(12) United States Patent
Jolley et al.

(10) Patent No.: US 6,792,824 B2
(45) Date of Patent: Sep. 21, 2004

(54) TILT-TELESCOPE STEERING COLUMN

(75) Inventors: William A Jolley, Waterford, MI (US); Kenneth D Kossak, Novi, MI (US); Richard T Chauvin, Clawson, MI (US); Kurt H Rinker, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 104 days.

(21) Appl. No.: 10/227,278

(22) Filed: Aug. 24, 2002

(65) Prior Publication Data

US 2004/0035238 A1 Feb. 26, 2004

(51) Int. Cl.$^7$ .................................................. B62D 1/18
(52) U.S. Cl. ........................................ 74/493; 280/775
(58) Field of Search .................... 74/493, 492; 280/775

(56) References Cited

U.S. PATENT DOCUMENTS

| 4,732,050 A | | 3/1988 | Vollmer |
| 5,282,394 A | * | 2/1994 | Dominique et al. .......... 74/493 |
| 5,338,064 A | | 8/1994 | Sadakata et al. |
| 5,363,716 A | | 11/1994 | Budzik, Jr. et al. |
| 5,555,772 A | * | 9/1996 | Schneider ..................... 74/493 |
| 5,743,150 A | * | 4/1998 | Fevre et al. .................. 74/493 |
| 5,787,759 A | * | 8/1998 | Olgren ......................... 74/493 |
| 5,988,679 A | | 11/1999 | Schelling et al. |
| 6,092,957 A | * | 7/2000 | Fevre et al. ................. 403/373 |

FOREIGN PATENT DOCUMENTS

GB    2273971 A  *  7/1994   ........... B62D/01/18

* cited by examiner

Primary Examiner—David A. Bucci
Assistant Examiner—Timothy McAnulty
(74) Attorney, Agent, or Firm—Edwin W. Bacon, Jr.

(57) ABSTRACT

A steering column has a jacket including relatively axially slidable, telescoping, upper and lower jacket members. An anchorage pivotally supports the lower jacket member for vertical tilt movement of the steering column. Locking mechanism locks the steering column in vertically adjusted position and locks the upper jacket member in axially adjusted position relative to the lower jacket member.

10 Claims, 6 Drawing Sheets

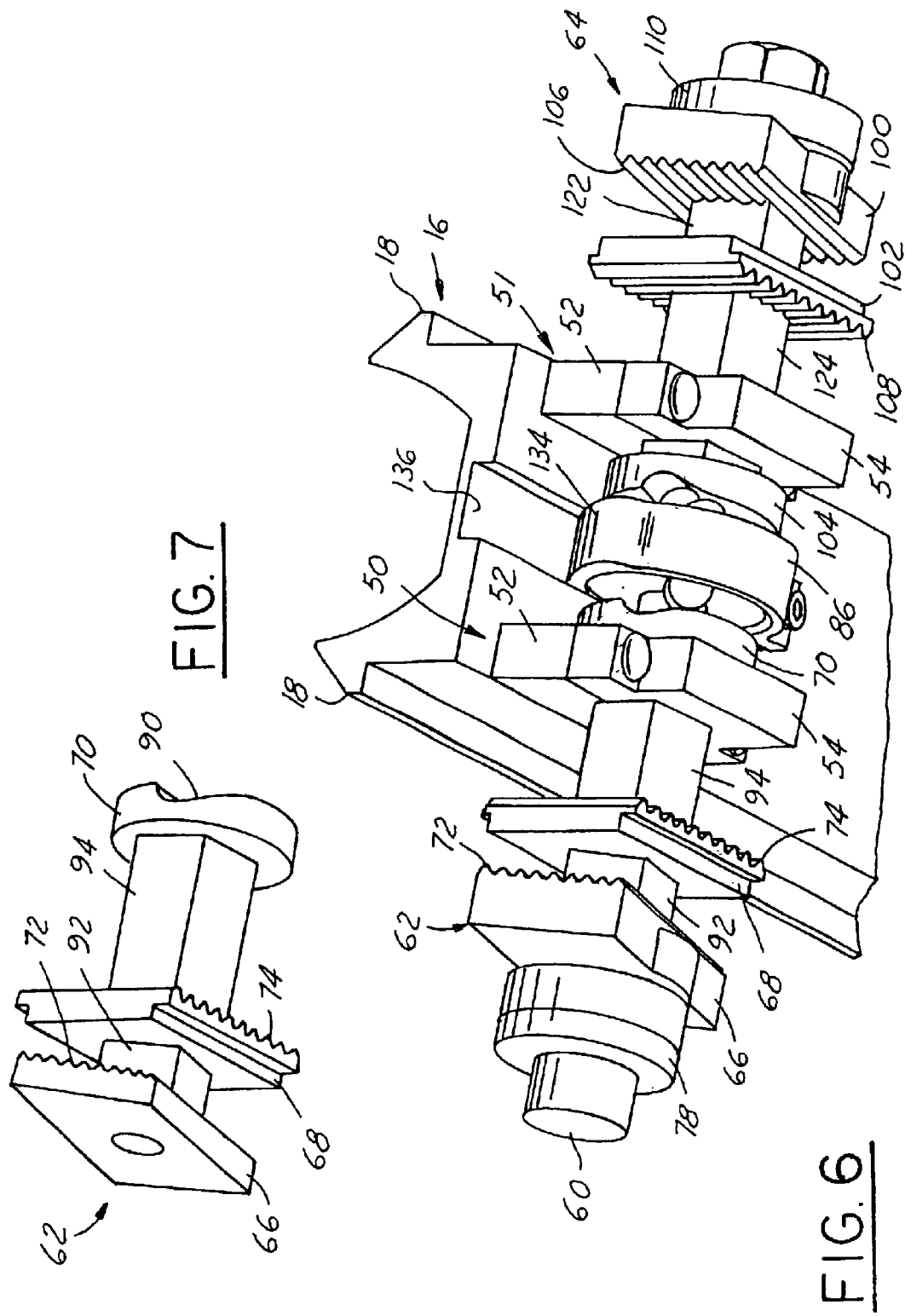

TILT-TELESCOPE STEERING COLUMN

FIELD OF THE INVENTION

The present invention relates generally to tilt-telescope steering columns, and more particularly to a tilt-telescope steering column which can be locked in an extended or contracted position and can also be locked in an adjusted tilt position.

BACKGROUND OF THE INVENTION

Tilt-telescope steering columns are generally known in the prior art, but typically have a large number of parts, some of which are part of a system to lock the steering column in an adjusted telescope position and some of which are part of a system to provide a tilt lock. However, integrating the two systems and reducing the number of parts has been a problem.

SUMMARY OF THE INVENTION

In accordance with the present invention, the steering column has a jacket including relatively axially slidable and telescoping upper and lower jacket members enabling the steering column to be extended or contracted, and an anchorage pivotally supporting the lower jacket member so that the entire steering column can be tilted vertically.

A locking mechanism is provided for locking the steering column in vertically adjusted position and also for locking the upper jacket member in axially adjusted position relative to the lower jacket member. The locking mechanism preferably includes a bracket having a bracket wall formed with an elongated tilt adjustment slot, and with a set of bracket teeth adjacent to the tilt adjustment slot.

The upper jacket member of the steering column has a jacket wall formed with an elongated axial adjustment slot, and with a set of jacket teeth adjacent to the axial adjustment slot.

A locking bolt extends through the slots. A column lock axially slidably mounted on the bolt has first locking teeth opposed to the bracket teeth and second locking teeth opposed to the jacket teeth.

The column lock is axially movable to a first position in which the first locking teeth engage the bracket teeth and the second locking teeth engage the jacket teeth to lock the steering column in vertically adjusted position and also to lock the upper jacket member in axially adjusted position. The column lock is movable to a second position in which the first locking teeth disengage the bracket teeth and the second locking teeth disengage the jacket teeth to enable vertical tilt adjustment of the steering column and axial adjustment of the upper jacket member.

More specifically, the bracket preferably has a second bracket wall, the two bracket walls being spaced laterally outwardly of the steering column, and with the second bracket wall formed with a second elongated tilt adjustment slot and with a second set of bracket teeth adjacent to the second slot. The upper jacket member preferably has a second jacket wall formed with a second elongated axial adjustment slot and with a second set of jacket teeth adjacent to the second axial adjustment slot. The locking bolt extends through all of the slots. A second column lock axially slidably mounted on the bolt functions relative to the second set of bracket teeth and the second set of jacket teeth in the same manner as the first mentioned column lock functions relative to the first mentioned set of bracket teeth and the first mentioned jacket teeth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings wherein:

FIG. 6 is a perspective view of parts of the mechanism for locking the steering column in adjusted telescoping position and in adjusted tilt position;

FIG. 7 is a perspective view of one of the column locks; and

DETAILED DESCRIPTION OF THE PREFERRED EMBODIMENT

Figure 1:
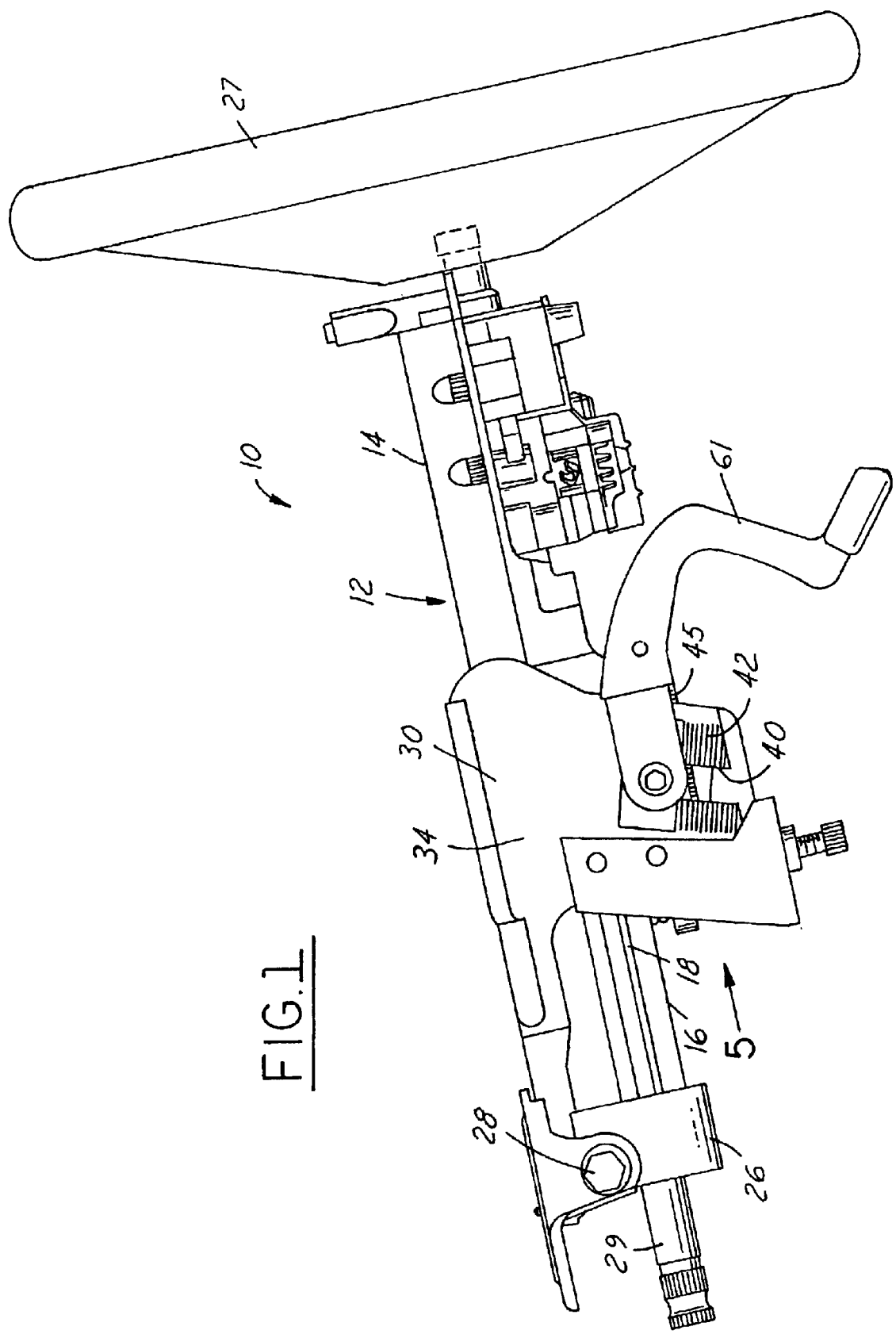
FIG. 1 is a side elevational view of a steering column constructed in accordance with the invention.

The following description of the preferred embodiment is merely exemplary in nature and is in no way intended to limit the invention, its application, or uses.

Referring now more particularly to the drawings, there is shown a steering column 10 for an automotive vehicle. The steering column 10 has a jacket 12 which includes an upper jacket member 14 and a lower jacket member 16 axially slidably telescoped in the upper jacket member. The lower jacket member 16 has ribs 18 which slidably engage longitudinally extending grooves 20 in vertical side walls 22 and 24 of the upper jacket member 14 so that the upper jacket member can slide axially relative to the lower jacket member. The lower jacket member 16 is pivoted to an anchorage 26 by a pivot pin 28 so that the entire steering column can be tilted up and down. A steering shaft 29 extends lengthwise within the jacket 12 and has a steering wheel 27 on the rear end. The rear end of the steering shaft 29 is rotatably mounted in the upper jacket member 14 for movement axially with the upper jacket member. The front end of the steering shaft 29 is mounted for rotation and for axial sliding movement in the anchorage 26.

A bracket 30 rigidly secured to vehicle frame structure has vertical side walls 34 and 36 respectively adjacent to and spaced outwardly of and parallel to the side walls 22 and 24 of the upper jacket member 14 of the steering column. The bracket side walls 34 and 36 have elongated generally upwardly extending tilt adjustment slots 40 and 42 which are parallel and laterally opposite one another. The bracket side wall 34 has a set of laterally outwardly facing bracket teeth 41 adjacent to the slot 40 and the side wall 36 has a set of laterally outwardly facing bracket teeth 43 adjacent to the slot 42. The slots 40 and 42 are nearly vertical although roughly perpendicular to a line from the axis of the pivot pin 28 to the slots.

The side walls 22 and 24 of the upper jacket member 14 have elongated axial adjustment slots 44 and 46. The slots 44 and 46 extend parallel to the lengthwise dimension of the steering column 10 and are laterally opposite one another. The side wall 22 has a set of laterally outwardly facing teeth 45 adjacent to the slot 44 and the side wall 24 has a set of laterally outwardly facing teeth 47 adjacent to the slot 46. The two adjacent slots 40 and 44 on one side of the steering column 10 are generally in crossing relation to one another, as are the two adjacent slots 42 and 46 on the opposite side of the steering column.

At the rear end of the lower jacket member 16 are two laterally spaced apart, vertical stanchions 50 and 51 each comprising a pillar 52 with a cap 54 bolted or otherwise rigidly secured to the bottom of each pillar. Each pillar and its cap define a square opening 56 and these openings 56 are transversely aligned with one another and also aligned with the points of crossing of the slots 40, 44 and 42, 46.

A transverse locking bolt 60 extends across the steering column 10, through the bracket slots 40, 42, through the upper jacket member slots 44, 46 and through the openings 56 defined by the pillars 52 and their associated caps 54. The locking bolt 60 can be rotated by a handle 61 fixed on one end thereof.

Sleeved on the bolt 60 are two identical tubular column locks 62 and 64. See FIGS. 2, 6 and 7. The column locks 62 and 64 are slidable axially on the bolt 60. The column lock 62 has integral lock plates 66, 68 and 70. The plate 66 is on the outer side of the bracket side wall 34, the plate 68 is between the bracket side wall 34 and the adjacent side wall 22 of the upper jacket member 14, and the plate 70 is on the inner side of the stanchion 50. The plate 66 has a set of laterally inwardly facing teeth 72 opposed to the bracket teeth 41 on the bracket side wall 34 and the plate 68 has a set of laterally inwardly facing teeth 74 opposed to the teeth 45 on the side wall 22 of the upper jacket member 14.

A cam disc 78 is fixed on the end of the locking bolt 60 adjacent the handle 61. The cam disc 78 is laterally outwardly of the plate 66, having laterally inwardly extending cams 80 respectively engaging laterally outwardly facing grooved cam tracks 82 in the plate 66 of the column lock 62. A center cam disc 86 is fixed on the locking bolt 60 on the laterally inner side of the plate 70 of the column lock 62, having laterally outwardly extending cams 88 respectively engaging laterally inwardly facing grooved cam tracks 90 in the plate 70 of the column lock 62.

Between the plates 66 and 68, the column lock 62 has a square neck 92 which extends slidably through the tilt adjustment slot 40 in the bracket side wall 34 and between the plates 68 and 70, the column lock 62 has a square neck 94 which extends slidably through the axial adjustment slot 44 in the side wall 22 of the upper jacket member 14. The neck 94 also extends slidably through the square opening 56 of the stanchion 50. The tilt adjustment slot 40 in the bracket side wall 34, the axial adjustment slot 44 in the side wall 22 of the upper jacket member 14 and the square opening 56 of the stanchion 50 prevent the column lock 62 from rotating.

The column lock 64 has integral lock plates 100, 102 and 104. The plate 100 is on the outer side of the bracket side wall 36, the plate 102 is between the bracket side wall 36 and the adjacent side wall 24 of the upper jacket member 14, and the plate 104 is on the inner side of the stanchion 51. The plate 100 has a set of laterally inwardly facing teeth 106 opposed to the bracket teeth 43 of the bracket side wall 36 and the plate 102 has a set of laterally inwardly facing teeth 108 opposed to the teeth 47 of the side wall 24 of the upper jacket member 14.

A cam disc 110 is fixed on the end of the locking bolt 60 opposite the handle 61. The cam disc 110 is laterally outwardly of the plate 100 having laterally inwardly extending cams 112 respectively engaging laterally outwardly facing grooved cam tracks 114 in the plate 100 of the column lock 64. The center cam disc 86 has laterally outwardly extending cams 118 respectively engaging laterally inwardly facing grooved cam tracks 120 in the plate 104.

Between the plates 100 and 102, the column lock 64 has a square neck 122 which extends slidably through the tilt adjustment slot 42 in the bracket side wall 36, and between the plates 102 and 104, the column lock 64 has a square neck 124 which extends slidably through the axial adjustment slot 46 in the side wall 24 of the upper jacket member 14. The neck 124 also extends slidably through the square hole 56 of the stanchion 51. The tilt adjustment slot 42 in the bracket side wall 36, the axial adjustment slot 46 in the side wall 24 of the upper jacket member 14 and the square opening 56 in the stanchion 51 prevent the column lock 64 from rotating.

A coil spring 130 is compressed between a cross member 132 of the bracket 30 and the lower jacket member 16 to keep an upward pressure on the steering column 10.

The center cam disc 86 has a lobe 134 on its periphery which, in the locking rotative position of the locking bolt 60, has pressure engagement with the bottom of a groove 136 in the lower jacket member 16 to eliminate lash and stiffen the steering column.

Figure 4:
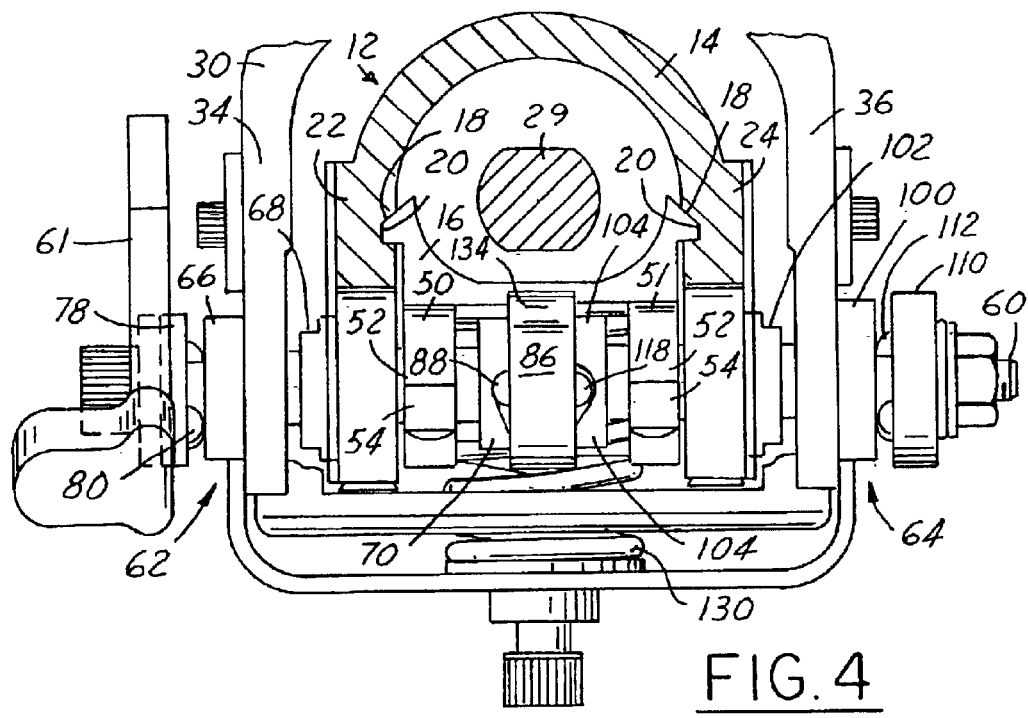
FIG. 4 is a view partially in section looking in the direction of the arrow 4 in FIG. 2, showing the locking mechanism in locked position.
Figure 5:
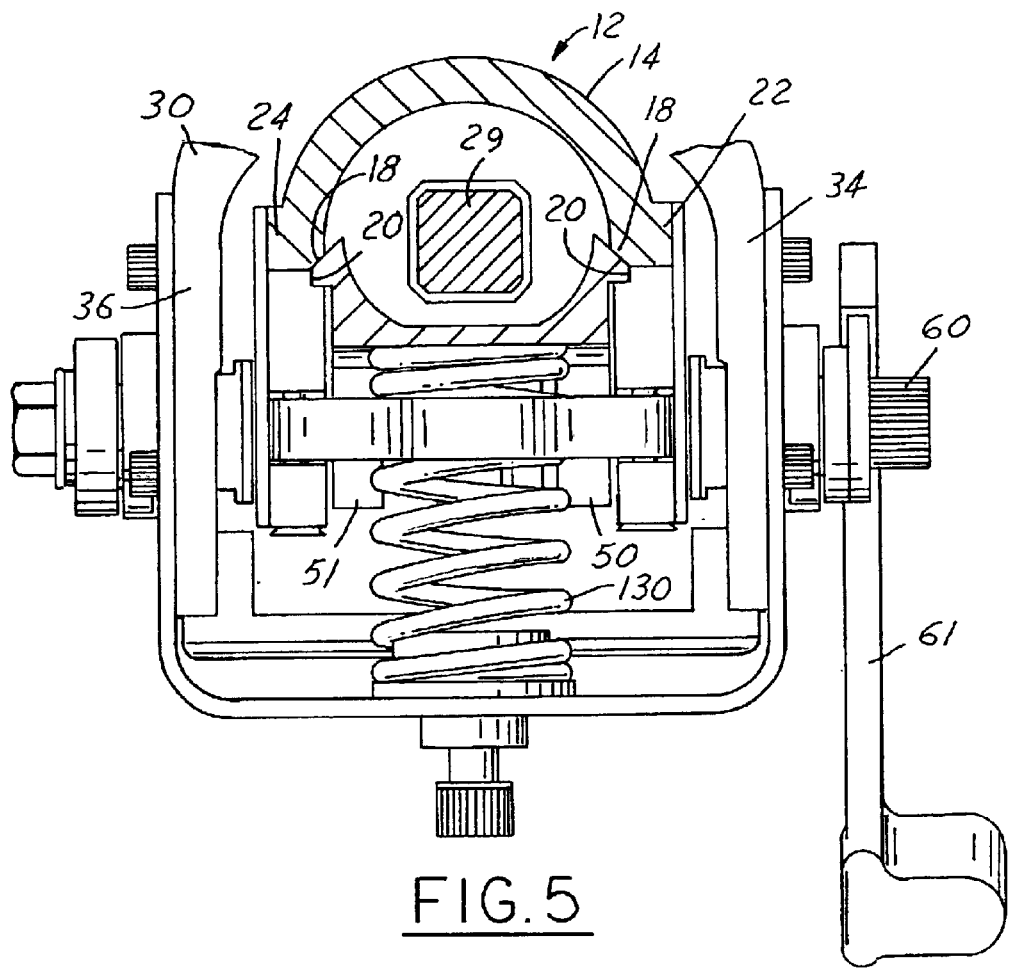
FIG. 5 is a view partially in section looking in the direction of the arrow 5 in FIG. 1.

To lock the steering column 10 in vertically adjusted position and the upper jacket member 14 in axially adjusted position relative to the lower jacket member 16, the locking bolt 60 is rotated in one direction by the handle 61 to a position in which the cams 80 and 112 on the cam discs 78 and 110 engage the cam tracks 82 and 114 on the plates 66 and 100 to simultaneously move the column locks 62 and 64 laterally inwardly to the FIG. 4 position in which the teeth 72 and 106 of the lock plates 66 and 100 engage the teeth 41 and 43 on the bracket side walls 34 and 36, and the teeth 74 and 108 of the plates 68 and 102 engage the teeth 45 and 47 on the side walls 22 and 24 of the upper jacket member 14. In the locked condition, the handle 61 is in the position shown in FIG. 1. Also, in the locked condition, the loble 134 on the center cam disc 86 bears against the bottom of the groove in the lower jacket member 16 to eliminate lash and stiffen the steering column.

Figure 2:
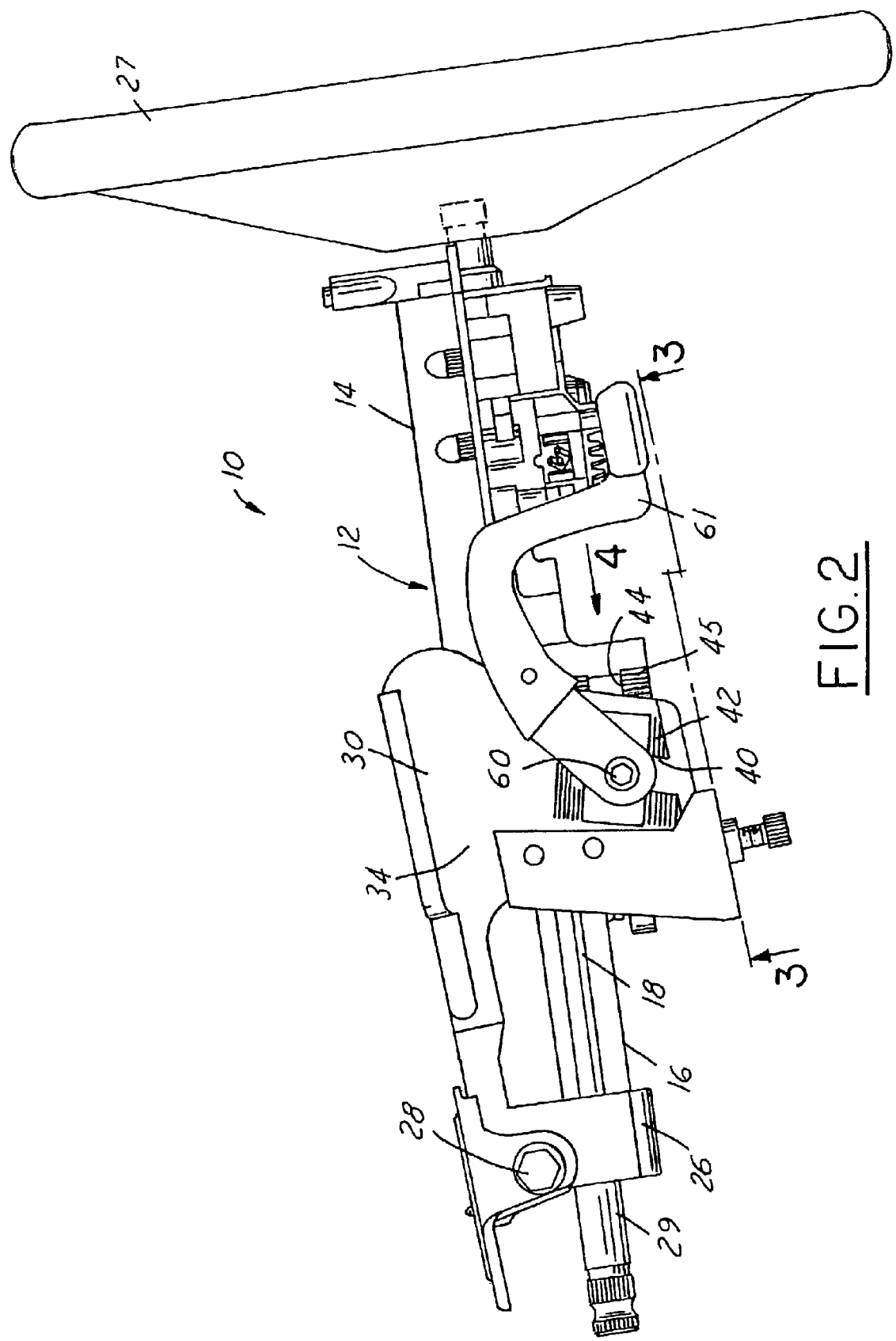
FIG. 2 is a side elevational view similar to FIG. 1, but shows parts of the steering column in a different position.
Figure 3:
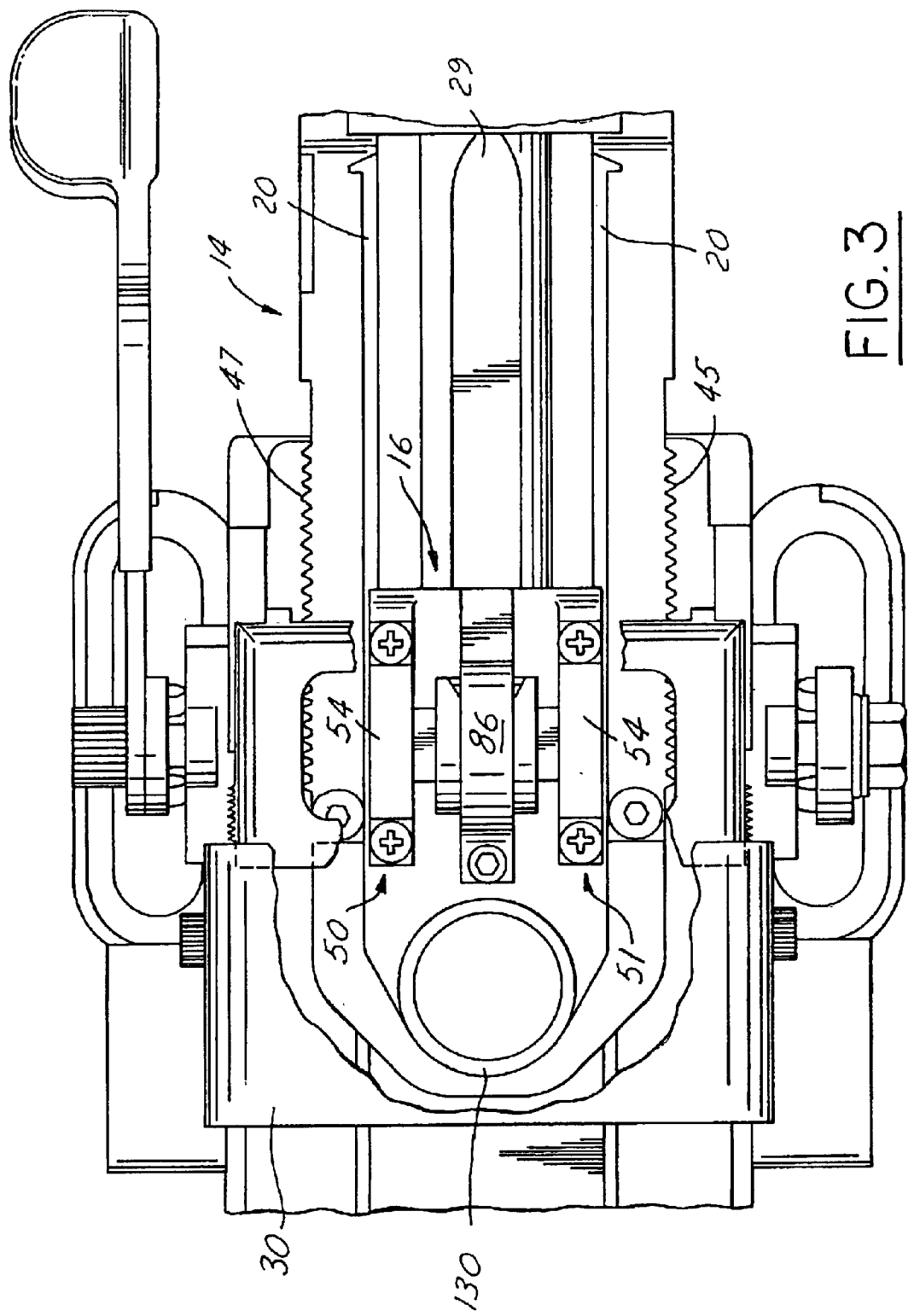
FIG. 3 is a view taken on the line 3—3 in FIG. 2, with parts broken away.
Figure 8:
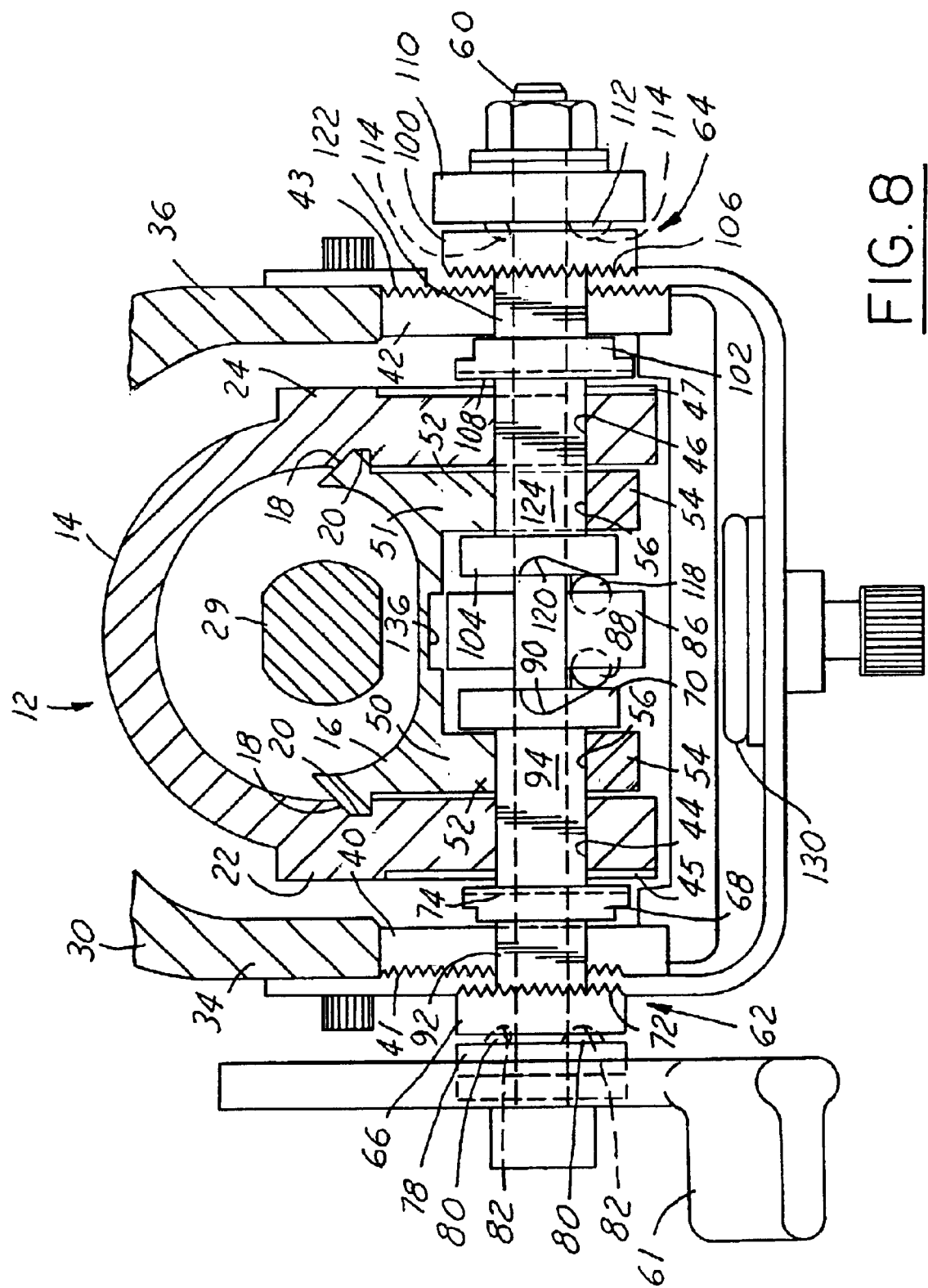
FIG. 8 is a sectional view similar to FIG. 4, showing the locking mechanism in the unlocked position.

To adjust the tilt of the steering column 10 and the axial position of the upper jacket member 14 relative to the lower jacket member 16, the locking bolt 60 is rotated in the opposite direction to a position in which the handle 61 is as shown in FIG. 2. In this rotative of the locking bolt 60, the cams 88 and 118 on the center cam disc 86 engage the cam tracks 90 and 120 on the plates 70 and 104 of the column locks 62 and 64 to simultaneously move the column locks laterally outwardly to the FIG. 8 position in which the teeth on the column locks disengage the teeth on the side walls of the bracket 30 and of the upper jacket member 14.

The description of the invention is merely exemplary in nature and, thus, variations do not depart from the gist of the invention are intended to be within the scope of the invention. Such variations are not to be regarded as a departure from the spirit and scope of the invention.

What is claimed is:

1. A steering column assembly comprising:
   an elongated steering column having a jacket including relatively axially slidable, telescoping, upper and lower jacket members,
   an anchorage pivotally supporting the lower jacket member for vertical tilt movement of the steering column,
   locking mechanism for locking said steering column in vertically adjusted position and for locking said upper jacket member in axially adjusted position relative to said lower jacket member,
   said locking mechanism comprising a bracket,
   the bracket having a bracket wall formed with an elongated tilt adjustment slot,
   the upper jacket member having a jacket wall adjacent to the bracket wall formed with an elongated axial adjustment slot,
   said bracket wall having a set of bracket teeth adjacent said tilt adjustment slot,
   said jacket wall having a set of jacket teeth adjacent said axial adjustment slot,
   a locking bolt extending through said slots,
   a column lock axially slidably mounted on said bolt having first locking teeth opposed to the bracket teeth and second locking teeth opposed to the jacket teeth, and
   means for moving said column lock axially to a first position in which the first locking teeth engage the bracket teeth and the second locking teeth engage the jacket teeth to lock the steering column in vertically adjusted position and also to lock the upper jacket member in axially adjusted position relative to the lower jacket member, and for moving said column lock to a second position in which the first locking teeth disengage the bracket teeth and the second locking teeth disengage the jacket teeth to enable vertical tilt adjustment of the steering column and axial adjustment of the upper jacket member relative to the lower jacket member,
   wherein the means for moving said column lock axially comprises a first cam mounted on said bolt and engagable with a first cam track on said column lock to move said column lock to said first position upon clockwise rotation of said bolt, and a second cam mounted on said bolt and engagable with a second cam track on said column lock to move said column lock to said second position upon counter-clockwise rotation of said bolt,
   wherein said first and second cams are spaced apart axially of said bolt and said column lock is between said first and second cams, and
   wherein said column lock has axially spaced apart first, second and third plates with the second plate between said first and third plates, said first cam track is provided on said first plate, said second cam track is provided on said third plate, said first locking teeth are provided on said first plate, and said second locking teeth are provided on the second plate.

2. The steering column assembly of claim 1, wherein the said second cam is mounted on said bolt by a disc formed with a lobe having pressure engagement with said lower jacket member when said bolt is rotated clockwise far enough to move said column lock to said first position, to eliminate lash and stiffen the steering column.

3. The steering column assembly of claim 1, wherein said bracket wall extends between the first and second plates and the jacket wall extends between said second and third plates.

4. The steering column assembly of claim 3, further including a handle for rotating said bolt.

5. A steering column assembly comprising:
   an elongated steering column having a jacket including relatively axially slidable, telescoping, upper and lower jacket members,
   an anchorage pivotally supporting the lower jacket member for vertical tilt movement of the steering column,
   locking mechanism for locking said steering column in vertically adjusted position and for upper jacket member in axially adjusted position relative to said lower jacket member,
   said locking mechanism comprising a bracket,
   the bracket having laterally spaced first and a second bracket walls on opposite sides of the steering column,
   said first bracket wall having a first elongated tilt slot,
   a first set of teeth on said first bracket wall adjacent said first elongated tilt slot,
   said second bracket wall having a second elongated tilt slot parallel to said first elongated tilt slot,
   a second set of teeth on the second bracket wall adjacent to the second elongated tilt slot,
   the upper jacket member having a first jacket wall adjacent to said first bracket wall and a second jacket wall adjacent to said second bracket wall,
   said first jacket wall having a first elongated axial adjustment slot,
   a first set of jacket teeth on said first jacket wall adjacent to said first axial adjustment slot,
   said second jacket wall having a second elongated axial adjustment slot parallel to said first axial adjustment slot,
   a second set of jacket teeth on said second jacket wall adjacent to said second axial adjustment slot,
   a locking bolt extending through all of said slots,
   a first column lock axially slidably mounted on said bolt having first locking teeth opposed to the first set of bracket teeth and second locking teeth opposed to the first set of jacket teeth,
   a second column lock axially slidably mounted on said bolt having a third set of locking teeth opposed to the second set of bracket teeth and fourth locking teeth opposed to the second set of jacket teeth, means for simultaneously moving said first and second column locks to a first position thereof in which the first looking teeth engage the first set of bracket teeth, the second locking teeth engage the first set of jacket teeth, the third locking teeth engage the second set of bracket teeth, and the fourth locking teeth engage the second set of jacket teeth to lock the steering column in vertically adjusted position and also to lock the upper jacket member in axially adjusted position relative to said lower jacket member, and for simultaneously moving said first and second column locks to a second position thereof in which the first looking teeth disengage the first set of bracket teeth, the second locking teeth disengage the first set of jacket teeth, the third locking teeth disengage the second set of bracket teeth, and the fourth locking teeth disengage the second set of jacket teeth to enable vertical tilt adjustment of the steering column and axial adjustment of the upper jacket member relative to the lower jacket member.

6. The steering column assembly of claim 5, wherein the means for moving said first and second column locks comprises a first cam disc mounted on said bolt having a first cam engagable with a first cam track on said first column lock to move said first column lock to said first position thereof upon clockwise rotation of said bolt, a second cam disc mounted on said bolt having a second cam engagable with a second cam track on said first column lock to move said first column lock to said second position thereof upon counterclockwise rotation of said bolt, a third cam disc mounted on said bolt having a third cam engagable with a third cam track on said second column lock to move said second column lock to said first position thereof upon clockwise rotation of said bolt, said second cam disc having a fourth cam engagable with a fourth cam track on said second column lock to move said second column lock to said second position thereof upon counterclockwise rotation of said bolt.

7. steering column of claim 6, wherein said second cam disc is between adjacent ends of said column locks, said first cam disc is at an opposite end of the first column and said third cam disc is at an opposite end of the second column lock.

8. The steering column assembly of claim 7, wherein said first column lock has axially spaced apart first, second and third plates with the second plate between said first and second plates, said first cam track is provided on said first plate, said second cam track is provided on said third plate, said first locking teeth are provided on the first plate, the second locking teeth are provided on the second plate, the second column lock has axially spaced apart fourth, fifth and sixth plates with the fifth plate between the fourth and sixth plates, said third cam track is provided on the fourth plate, said fourth cam track is provided on said sixth plate, said third locking teeth are provided on said fourth plate, and the fourth locking teeth are provided on the fifth plate.

9. The steering column assembly of claim 8, wherein said second cam disc is formed with a lobe having pressure engagement with said lower jacket member when said bolt is rotated clockwise far enough to move said column locks to the first position thereof, thereby to eliminate lash and stiffen the steering column.

10. The steering column assembly of claim 9, wherein said first bracket wall extends between said first and second plates, said first jacket wall extends between said second and third plates, said second bracket wall extends between said fourth and fifth plates, and said second jacket wall extends between said fifth and sixth plates.

* * * * *